(12) United States Patent
Alisar et al.

(10) Patent No.: US 12,132,321 B2
(45) Date of Patent: Oct. 29, 2024

(54) CONTROL OF A DFIG GRID SIDE CONVERTER

(71) Applicant: Siemens Gamesa Renewable Energy Innovation & Technology S.L., Sarriguren (ES)

(72) Inventors: Ibrahim Alisar, Izmir (AR); Erhan Demirok, Izmir (AR); José Luis Rodriguez Izal, Burlada (ES); Estanislao Pablo Tomey Lopez, Navarra (ES); Iosu Aizpuru Larranaga, Guipuzkoa (ES); Antxon Arrizabalaga Etxezarreta, Gipuzkoa (ES); Aitor Idarreta Garate, Guipuzkoa (ES); Unai Iraola Iriondo, Guipuzkoa (ES); Mikel Mazuela Larranaga, Gipuzkoa (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/034,759

(22) PCT Filed: Nov. 2, 2021

(86) PCT No.: PCT/EP2021/080321
§ 371 (c)(1),
(2) Date: May 1, 2023

(87) PCT Pub. No.: WO2022/096427
PCT Pub. Date: May 12, 2022

(65) Prior Publication Data
US 2023/0420951 A1 Dec. 28, 2023

(30) Foreign Application Priority Data
Nov. 4, 2020 (EP) .................................... 20382955

(51) Int. Cl.
*H02J 3/38* (2006.01)
*F03D 9/25* (2016.01)
(Continued)

(52) U.S. Cl.
CPC .............. *H02J 3/381* (2013.01); *F03D 9/255* (2017.02); *H02J 3/1885* (2013.01); *H02J 3/46* (2013.01); *H02J 2300/28* (2020.01)

(58) Field of Classification Search
CPC .. H02J 3/381; H02J 3/1885; H02J 3/46; H02J 2300/28; F03D 9/255
See application file for complete search history.

(56) References Cited

U.S. PATENT DOCUMENTS

| 10,731,628 | B1 * | 8/2020 | Gadiraju | ................... | H02J 3/50 |
| 2010/0256829 | A1 * | 10/2010 | Alonso Sadaba | ......... | F03D 9/25 700/287 |

(Continued)

FOREIGN PATENT DOCUMENTS

| EP | 2317135 A1 | 5/2011 |
| EP | 3644497 A1 | 4/2020 |

(Continued)

OTHER PUBLICATIONS

European Search Report issued on Apr. 29, 2021 for application No. 20382955.1.

(Continued)

*Primary Examiner* — Daniel Cavallari
(74) *Attorney, Agent, or Firm* — Schmeiser, Olsen & Watts LLP

(57) ABSTRACT

A method for controlling the reactive power exchange of a DFIG wind facility with the grid is provided. The method includes determining a grid side converter reactive power thermal limit value and determining the value of the required DFIG magnetizing reactive power to be consumed by the stator. Then setting dynamically the sharing of the reactive power between the stator and the GSC such that the GSC reactive power value is the difference between the reactive power demand of the DFIG wind facility and the magnetizing reactive power consumed by the stator. Afterwards operating the DFIG wind turbine facility such that the absolute value of GSC reactive power is adjusted to be below the grid side converter reactive power thermal limit value value. An arrangement and a wind turbine are also provided.

14 Claims, 5 Drawing Sheets

Figure 1:
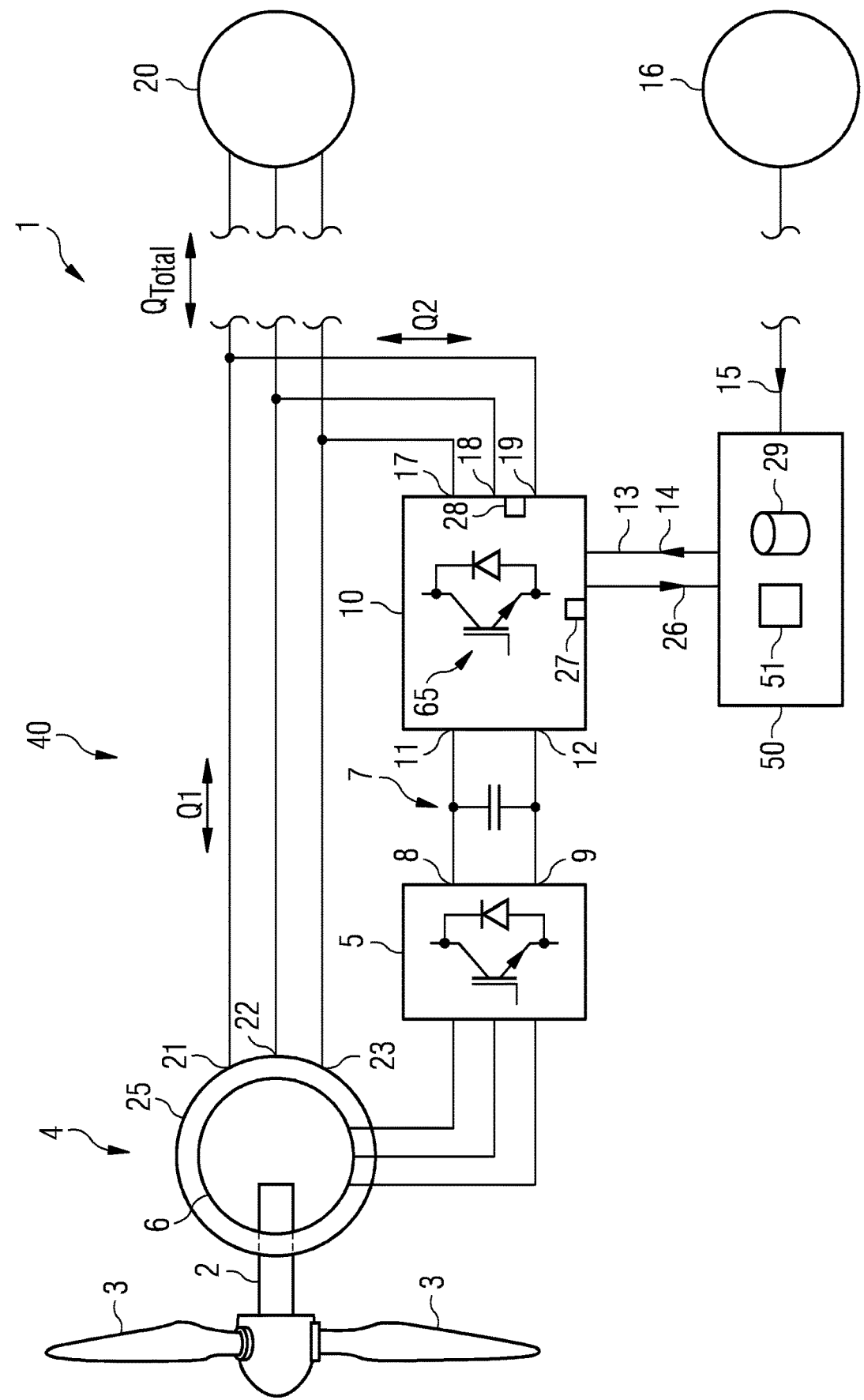

(51) Int. Cl.
  *H02J 3/18*   (2006.01)
  *H02J 3/46*   (2006.01)

(56) References Cited

U.S. PATENT DOCUMENTS

| | | | | |
|---|---|---|---|---|
| 2019/0013754 | A1* | 1/2019 | Wagoner | H02J 3/388 |
| 2019/0203693 | A1 | 7/2019 | Tiwari et al. | |
| 2020/0392942 | A1* | 12/2020 | Andersen | H02J 3/50 |
| 2023/0420951 | A1* | 12/2023 | Alisar | H02J 3/46 |

FOREIGN PATENT DOCUMENTS

| | | | |
|---|---|---|---|
| EP | 3731405 | A1 | 10/2020 |
| WO | 2017202429 | A1 | 11/2017 |

OTHER PUBLICATIONS

International Search Report and Written Opinion of the International Seraching Authority issued on Jan. 24, 2022 for application No. PCT/EP2021/080321.
PCT International Search Report and Written Opinion of International Searching Authority mailed Jan. 24, 2022 corresponding to PCT International Application No. PCT/EP2021/080321 filed Nov. 2, 2021.

\* cited by examiner

CONTROL OF A DFIG GRID SIDE CONVERTER

CROSS-REFERENCE TO RELATED APPLICATIONS

This application claims priority to PCT Application No. PCT/EP2021/080321, having a filing date of Nov. 2, 2021, which claims priority to EP Application No. 20382955.1, having a filing date of Nov. 4, 2020, the entire contents both of which are hereby incorporated by reference.

FIELD OF TECHNOLOGY

The following relates to a method and to an arrangement of controlling a utility grid connected grid side converter connected via a DC link and a rotor side converter to a rotor of a DFIG, in particular of a wind turbine. The following further relates to a wind turbine comprising the control arrangement.

BACKGROUND

A Doubly-Fed Induction Generator (DFIG) may conventionally be used in a wind turbine. The stator windings of the DFIG are connected to the utility grid and the rotor windings are connected to a converter via slip rings and back-to-back voltage source converters, such that the rotor and the grid currents may be controlled. An advantage of a DFIG may be that the rotor frequency may freely differ from the utility grid frequency, the utility grid frequency being e.g. 50 Hz or 60 Hz. By using the rotor side converter connected to the rotor windings of the DFIG it may be possible to control the rotor currents. Additionally, and it may be possible to adjust the active and reactive power fed to the utility grid from the stator in dependency of the rotational speed of the DFIG.

Conventionally, the optimization of the operating point of the full power train of a wind turbine, which includes the mechanical and electrical systems equipped with a DFIG, may not always be accurately fulfilled. Therefore, conventionally, the wind turbine does not deliver the maximum power output during operation and therefore, it has a higher Levelized Cost Of Energy (LCOE) and a lower Annual Energy Production (AEP).

The stator of the DFIG and the grid side converter may each supply or consume a particular amount or portion of reactive power required by the utility grid. It has been observed that set points of the reactive power may be crucial to minimize losses of the DFIG drive system. In conventional systems, converter losses increase with increased reactive power dispatch from or through the grid side converter.

The dispatch strategies proposed up to now are focused on either minimization of electrical losses or on an increased component lifetime. In an example, it is proposed to maximize the reactive power flow at the stator. Furthermore, the optimized reactive power sharing among the stator and the grid side converter has been proposed.

US 2019/013754 discloses systems and methods for allocating reactive power production and a DFIG wind turbine system including a DFIG and a power converter including a line side converter and a rotor side converter. A priority ratio being a ratio of reactive power production between the DFIG and the line side converter is determined based on operating parameters. The DFIG and the line-side converter are controlled such that a combined reactive power production from the DFIG and the line-side converter meet a reactive power production requirement.

US 2019/203693 A1 discloses a control method for increasing reactive power generation of a wind turbine having a DFIG, wherein wind forecast data are obtained by a control device.

Further, a real-time thermal model of the DFIG is generated using the wind forecast data. A reactive power set point of the DFIG is adjusted based on the real-time thermal model.

WO 2017/202429 A1 discloses a method for controlling an amount of reactive current provided from a wind turbine generator to a power grid during an abnormal power grid event. Thereby, the reactive current provided to the power grid is balanced between a reactive stator current and a reactive grid side inverter current.

It has been observed that conventional methods for controlling a DFIG still comprise considerable losses, in particular during particular operating conditions or different requirements as dictated by a utility grid operator.

Thus, there may be a need for a method and a corresponding arrangement of controlling a utility grid connected grid side converter connected via a DC link and a rotor side converter to a rotor of a DFIG, in particular of a wind turbine, wherein efficiency of the wind turbine may be improved and in particular wherein power losses are reduced or even minimized.

SUMMARY

According to a first aspect of the present invention a method for controlling the reactive power exchange of a DFIG wind facility with the grid is provided. The DFIG wind facility comprises a utility grid connected grid side converter connected via a DC link and a rotor side converter to a rotor of a DFIG. The method comprises determining a grid side converter reactive power thermal limit value (Q_GSC_thr_lim) and determining the value of the required DFIG magnetizing reactive power (Q_stator) to be consumed by the stator. Then setting dynamically the sharing of the reactive power between the stator and the GSC such that the GSC reactive power (Q_GSC) value is the difference between the reactive power demand (Q_total) of the DFIG wind facility and the magnetizing reactive power (Q_stator) consumed by the stator. Afterwards operating the DFIG wind turbine facility such that the absolute value of GSC reactive power (Q_GSC) is adjusted to be below the grid side converter reactive power thermal limit value (Q_GSC_thr_lim) value.

In an example, in case a total DFIG reactive power demand (Q_total) is greater than zero, i.e. DFIG should supply reactive power to a utility grid, the method may further comprise controlling the grid side converter to supply reactive power to serve the total DFIG reactive power demand according to a maximum possible degree so that the grid side converter operates within a thermal limit, so that in particular a thermal limit of the grid side converter is not exceeded. The method is easy to implement.

The method may be implemented in software and/or hardware.

The method may be performed by a control module of a wind turbine controller.

The rotor side converter may be connected to the windings of the rotor of the DFIG. The rotor side converter may be capable of converting an AC power stream from the rotor windings of the rotor of the DFIG to a DC power which is applied to the DC link.

The grid side converter may be connected by its input terminals to two DC terminals of the DC link. The grid side converter may be capable of converting the DC power to an AC power, in particular a three-phase AC power which is delivered at output terminals of the grid side converter. The output terminals of the grid side converter e.g. a three phase converter, may be connected to a power grid, in particular via one or more transformers at a point of common coupling to which other wind turbines may be connected and/or via optionally a wind farm transformer.

The output terminals of the stator of the DFIG may be connected by cables to the output terminals of the grid side converter optionally via one or more switches and/or filters or other electronic or electric components. In addition, the output terminals of the grid side converter may be connected to the output terminals of the stator by a three-winding transformer whose low-voltage terminals are connected to output terminals of stator and to the output terminals of the grid side converter separately. Moreover, the output terminals of the grid side converter may be connected to the output terminals of the stator by a transformer whose low-voltage side is connected to output terminals of grid side converter and high-voltage side is connected to output terminals of stator.

The output terminals of the wind turbine may, via one or more transformers, be connected to a point of common connection where several other wind turbines may be connected.

The method may be implemented by the control module of a wind turbine.

During operation, the stator of the DFIG and/or the grid side converter may deliver a portion of the reactive power such that the combination of the reactive power delivered by the stator and the grid side converter match with the total DFIG reactive power demand.

The total DFIG reactive power demand may correspond to the total reactive power to be delivered or consumed by the DFIG system including the DFIG, the rotor side converter, the DC link and the grid side converter to the utility grid. The total DFIG reactive power demand may be positive or negative.

A positive total DFIG reactive power demand may indicate that reactive power is to be supplied to the utility grid. A negative total DFIG reactive power demand may indicate that reactive power from the utility grid is to be consumed by the DFIG system.

The total DFIG reactive power demand may be a signal defined e.g. by a utility grid operator or the reactive power controller of a wind power plant. The method may ensure that the reactive power output of the DFIG system matches the total DFIG reactive power demand.

The grid side converter may for example be configured as a three-phase converter or inverter. The grid side converter may for example comprise six single-phase controllable switches, e.g. IGBTs, wherein each switch may be connected to one of the three output terminals or to a multiple of six single-phase thereby allowing parallel connections between the switches. The grid side converter may be controlled by supplying respective gate driver signals to each of the six controllable switches (in case of three-phase currents). By opening the controllable switches in a coordinated manner, a desired AC power stream having the reactive power as desired is output so that a thermal limit of the rotor side converter is not exceeded According an example, in case the reactive power is to be supplied to the utility grid, the grid side converter may provide the maximum possible reactive power so that a thermal limit of the rotor side converter is not exceeded. The thermal limit may be defined by one or more operational limit values, such as a maximum allowable reactive power output by the rotor side converter, a maximum allowed temperature, the junction temperature of the controllable switches, etc. In order to ensure that the thermal limit of the rotor side converter is not exceeded, the method may comprise considering grid side converter operation information, as will be explained in detail below.

The control of the grid side converter may continuously be performed which may also include adjusting a previously set amount of reactive power to be delivered by the rotor side converter. For example, if it is determined that the thermal limit of the rotor side converter is approached too closely, the amount of reactive power as delivered (or consumed) by the rotor side converter may be decreased in a dynamic manner. In contrast, if the thermal limit still appears to be far apart, the reactive power output by the rotor side converter may slightly be increased. Monitoring whether the thermal limit is approaching too closely may continuously be performed. To utilize the capability of the grid side converter it may in particular be advantageous, if the grid side converter comprises at least partly SiC electronic components, such as diodes and/or power transistor. Those electronic components may have a particular low loss even if high amounts of reactive power (or active power) are output or consumed.

In an example, the grid side converter may be controlled by a setpoint ($Q\_GSC$) of grid side converter reactive power. The method may comprise receiving grid side converter operation information regarding at least one of: a thermal condition of the grid side converter, in particular a grid side converter temperature; a grid side converter cooling parameter; a grid side converter operating point; output voltage of the grid side converter; output current of the grid side converter; active power output of the grid side converter; or reactive power output of the grid side converter. The method may further comprise determining, in particular dynamically, the setpoint ($Q\_GSC$) of the grid side converter reactive power further based on the grid side converter operation information and at least one operation parameter limit value.

The set point of the grid side converter reactive power defines the amount of reactive power to be output or consumed by the grid side converter. The set point may serve as an input to for driver circuitry. The driver circuitry may, based on the set point, be capable of generating gate driver signals and supplying them to the multiple controllable switches of the grid side converter.

The grid side converter operation information may comprise operation information of the grid side converter. Examples are given below. Receiving the grid side converter operation information may be advantageous in order to be able to check whether the thermal limit of the grid side converter is met or is not met. The grid side converter operation information may for example be delivered by one or more sensors arranged at the grid side converter and/or at input and/or output terminals of the grid side converter. By using the grid side converter operation information it may be determined whether the thermal limit of the grid side converter is reached or is not reached.

In an example, one or more temperature values e.g. measured by one or more sensors installed at the grid side converter, may be used to determine whether the thermal limit is reached or not. In other examples, theoretical considerations together with voltage and/or current and/or power and/or reactive power output measurements may be used to infer the temperature or the thermal condition of the grid side converter thereby allowing to assess whether the thermal limit is reached or not.

Determining the set point of the grid side converter reactive power based on the grid side converter operation information and on at least one operational parameter limit value may therefore ensure that the thermal limit of the grid side converter is not exceeded.

The thermal limit of the grid side converter may for example be defined by one or more operational parameter limit values, such as temperature limit values or electrical limit values. Thereby, a flexibility and ease to determine whether the thermal limit of the grid side converter is not exceeded is enabled. Furthermore, continuously receiving updated grid side converter operation information may allow to dynamically adjust the set point of the grid side converter reactive power, thereby improving the efficiency of the wind turbine and additionally avoiding any damage of the components of the grid side converter.

In an example, the setpoint (Q_GSC) of the grid side converter reactive power may be determined to not exceed a predetermined grid side converter (e.g. a temperature dependent GSC) reactive power limit value (e.g. Q_GSC_thr_lim).

Additionally or alternatively the setpoint (e.g. Q_GSC) of the grid side converter reactive power is determined and/or dynamically adapted such that a predetermined grid side converter temperature limit value is not exceeded, in particular comprising monitoring a grid side converter temperature.

The predetermined grid side converter power limit value may define a limit value of the reactive power which can e.g. maximally be output or consumed, i.e. absorbed, by the grid side converter. This reactive power limit value may, for example, be taken from a datasheet of the grid side converter or may be computed from other limit values given in the datasheet. The predetermined grid side converter temperature limit may relate to a temperature limit at a particular location close to or at each of the controllable switches of the grid side converter; or at any other defined location relative to the controllable switches. It may, for example, relate to a temperature limit at a cooling block of the grid side controller. The grid side converter temperature may relate to a mean value of temperatures measured at different locations of the grid side converter or may relate to an overall temperature of the grid side converter for example measured only by one temperature sensor.

In an example, other limit values, e.g. limit values of active power and/or limit values of voltage and/or current output by the grid side converter, may be defined and/or considered. A combination of two or more limit values may be employed for determining whether the thermal limit of the grid side converter is reached or not. Thereby, a great flexibility may be provided and the method may be adapted for the particular equipment for example adapted for the set of sensors present.

In an example, the method may comprise, in case a total DFIG reactive power demand (Q_total) is not greater than zero (e.g. DFIG should consume reactive power): determining a loss minimized setpoint (Q_GSC_loss_min) of the grid side converter reactive power by a loss minimization algorithm,
wherein:
in case an absolute value of the loss minimized setpoint (Q_GSC_loss_min) is greater than the grid side converter reactive power limit value (Q_GSC_thr_lim), the setpoint (Q_GSC) of the grid side converter reactive power may be set to the sign of the loss minimized setpoint (Q_GSC_loss_min) multiplied with the grid side converter reactive power limit value (Q_GSC_thr_lim), and in case the absolute value of the loss minimized setpoint (Q_GSC_loss_min) is not greater than the grid side converter reactive power limit value (Q_GSC_thr_lim), the setpoint (Q_GSC) of the grid side converter reactive power may be set to the grid side converter reactive power limit value.

In mathematical terms it may be expressed as follows:
if |Q_GSC_loss_min|>Q_GSC_thr_lim
then it may be set:

$Q\_GSC=\text{sgn}(Q\_GSC\_\text{loss\_min})*Q\_GSC\_thr\_lim$

Else it may be set:

$Q\_GSC=Q\_GSC\_\text{loss\_min}$,

Wherein Q_GSC_loss_min is the loss minimized setpoint of the grid side converter reactive power, and Q_GSC_thr_lim is the grid side converter reactive power limit value which may be defined as a positive value.

Q_GSC is the setpoint of the grid side converter reactive power, $\text{sgn}(x)=1$ if $x>0$ $\text{sgn}(x)=-1$ if $x<0$.

If the total DFIG reactive power demand is negative, the DFIG should consume reactive power from the utility grid. The loss minimized set point of the grid side converter reactive power may be considered to be a set point of the grid side converter reactive power thereby the total energy or power loss of the DFIG system may be minimized.

The loss minimization algorithm may be based on a detailed physical model of the entire DFIG system, i.e. including the DFIG, the rotor side converter, the DC link and the grid side converter at least; or of the entire wind turbine, i.e. including the drive train, the DFIG, the converter and the power cables and auxiliary system. If the loss minimized absolute value of the set point of the grid side converter reactive power is greater than the value of the grid side converter reactive power limit, then the sign of the set point of the grid side converter reactive power may be set to comply with the loss minimized set point of the grid side converter reactive power times the grid side converter reactive power limit value. If the absolute value of the loss minimized set point of the grid side converter reactive power is equal or smaller than the grid side converter reactive power limit value, then the set point of the grid side converter reactive power may be set to be equal to the loss minimized set point of the grid side converter reactive power.

Thereby, a simple implementation may be provided satisfying that the thermal limit of the grid side converter is not exceeded. The method may be easy to implement while ensuring that the thermal limit is not exceeded.

In an example, the loss minimization algorithm may be based on a physical model of the DFIG and/or the rotor side converter and/or the grid side converter and/or connecting cables and/or auxiliary equipment and/or mechanical drive train, wherein the loss minimization algorithm may be configured to obtain the loss minimized setpoint (Q_GSC_loss_min) of the grid side converter reactive power by solving at least one non-linear equation, in particular in an iterative manner.

By using a physical model an accurate loss estimation may be enabled. Furthermore, a selection of the optimum operating point may also be enabled. An independent variable for the optimization process may be the sharing of the demanded reactive power amount between the DFIG stator (Q1) and the grid side converter (Q2).

In conventional loss minimization strategies, several losses have been neglected. For example, core losses and their dependency on the rotational speed, the frequency and the voltage may have been neglected.

In examples of the present invention the dependency of core losses from the rotational speed and/or the frequency and/or the voltage may be considered. Further, additional losses according to IEC60034-2 which are conventionally been neglected, may be considered in some examples of the present invention. Furthermore, Eddy current additional losses in the rotor and its dependence with the frequency and temperature has conventionally not been considered but may be considered in examples of the present invention. Furthermore, windage losses, friction losses and brushes contact voltage drop losses may be considered in examples of the present invention. Furthermore, power cable losses may also be considered in examples of the present invention. In particular, winding losses including its temperature dependence may be considered in examples of the present invention. In particular, the loss minimization algorithm may be performed dynamically, i.e. continuously receiving operational parameter values as obtained during the operation of the DFIG system. Further, the loss minimization algorithm may comprise to continuously and dynamically determine the loss minimized set point of the grid side converter reactive power. Thereby, operation of the wind turbine may be improved and damage may be avoided.

In an example, the loss minimization algorithm may be adapted to consider of at least one of: at least one mechanical power train loss, in particular in dependence of rotational speed and/or active power output; at least one DFIG loss, in particular in dependence of active power and/or voltage and/or rotational speed and/or at least one temperature and/or the total DFIG reactive power demand and/or the setpoint of the grid side converter reactive power (Q_GSC) and/or the reactive power output by the stator of the DFIG and/or AC output frequency; at least one converter loss, in particular in dependence of active power and/or voltage and/or rotational speed and/or at least one temperature and/or the total DFIG reactive power demand and/or the setpoint of the grid side converter reactive power (Q_GSC) and/or the reactive power output by the stator of the DFIG and/or AC output frequency; at least one power cable loss and/or auxiliary system consumption and/or cooling system consumption, in particular comprising stator cable loss and/or DFIG cooling fan consumption.

Thereby, a full physical model may be the basis of the loss minimized set point of the reactive power of the grid side converter. Thereby the control may be improved.

In an example, the DFIG loss may include at least one of: stator loss, in particular winding joule loss and/or core loss and/or additional loss; rotor loss, in particular winding joule loss and/or core loss and/or additional loss; windage loss; friction loss; brush voltage drop. The converter loss may include at least one of: switching commutation loss; inductance core loss; filter capacitor loss; auxiliary system and supplies; switching loss; RSC and GSC Power cable loss; Protection and/or manoeuvre device loss.

Thereby, the model may be improved with respect to conventionally known models regarding accuracy.

In an example, the method may further comprise setting the setpoint (Q_stator) of the reactive power output by the stator of the DFIG to the total DFIG reactive power demand (Q_total) diminished by the setpoint (Q_GSC), of the grid side converter reactive power.

In mathematical language this may be expressed as setting $$Q\_stator = Q\_total - Q\_GSC,$$

wherein Q_stator is the setpoint of the reactive power output by the stator of the DFIG.

Thereby, it may be ensured that the delivered or consumed reactive power matches the total DFIG reactive power demand. Thereby, grid stability and predictability may be improved.

The stator reactive power may be controlled by the rotor side converter. The reactive power exchange inside the DFIG makes the rotor side converter reactive power proportional to the sum of the leakage and magnetization inductances reactive power consumption plus the reactive power exchanged through the stator, herein stator reactive power. The rotor side converter controller may include two governors: one for active power regulation and a second for the reactive power regulator reactive power governor. The rotor side converter solid state switches may operate following commands that may result from the combination of both governors. The primary control parameter of each controller may be either the stator active and reactive power or the stator active or reactive current.

In an example, the grid side converter may be configured as or may be a multiphase DC-AC-converter and may comprise a plurality of power transistors, wherein at least one, in particular all, power transistor comprises a diode connected in parallel. The power transistors may be IGBTs. The diode may be connected in parallel in a reversed manner.

In an example, at least one, in particular all, of the diodes and/or at least one, in particular all, the power transistors may be Si—C based, and/or at least one, in particular all, of the transistor may comprise a SiC-MOSFET.

Silicon carbide (SiC) denotes a semiconductor containing silicon and carbon. SiC may advantageously be used in semiconductor electronic devices that operate at high temperatures and/or high voltages. The power transistors may for example be configured as a junction-gate FET or a MOSFET or insulated-gate bipolar transistor (IGBT). Such kind of transistors may be operated at relatively high temperatures without exhibiting excessive losses.

In an example, a stator of the DFIG may be coupled to the utility grid. Thereby, a conventional design of a DFIG connected to a utility grid may be supported. In particular, three-phase output terminals of stator windings of the DFIG may be connected to output terminals of the grid side converter which may in turn be connected to the utility grid, via one or more transformers and in particular also a point of common coupling.

In an example, the DFIG may be a wind turbine generator mechanically coupled to a rotor at which plural rotor blades are connected. Thereby, conventionally available wind turbines equipped with a DFIG may be supported by the described control method and arrangement.

It should be understood, that features, individually or in any combination, disclosed, explained, provided or used for a method of controlling a utility grid connected grid side converter connected via a DC link and a rotor side converter to a rotor of a DFIG, are, individually or in any combination, also applicable to an arrangement for controlling a utility grid connected grid side converter connected via a DC link and a rotor side converter to a rotor of a DFIG, and vice versa, according to examples of the present invention.

In a second aspect, an arrangement for controlling a utility grid connected grid side converter connected via a DC link and a rotor side converter to a rotor of a DFIG (e.g. of a wind turbine) is provided. The arrangement comprises an arithmetic and/or logic processor configured to control, in case a total DFIG reactive power demand (Q_total) is greater than zero the grid side converter to supply reactive power to serve the total DFIG reactive power demand according to a maximum possible degree so that a thermal limit of the grid side converter is not exceeded.

In a third aspect, a wind turbine is provided. The wind turbine may comprise a wind turbine rotor at which plural rotor blades are connected; a DFIG mechanically coupled to the wind turbine rotor; a rotor side converter connected to a rotor of the DFIG; a DC link connected to the rotor side converter; a grid side converter connected to the DC-link; and an arrangement according to the preceding embodiment, connected to control the grid side converter.

The aspects defined above and further aspects of the present invention are apparent from the examples to be described hereinafter and which are explained with reference to the figures.

BRIEF DESCRIPTION

Figure 2:
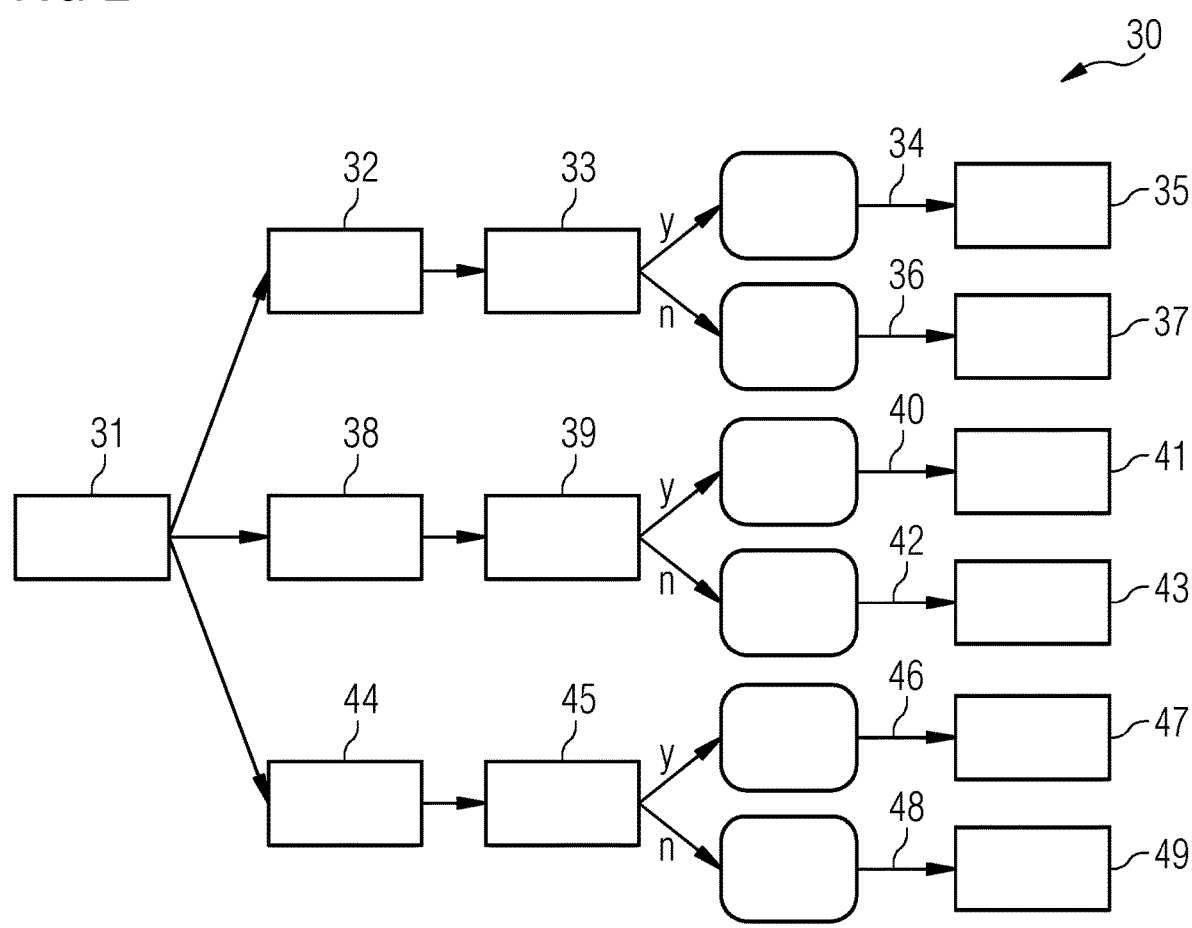
Figure 3:
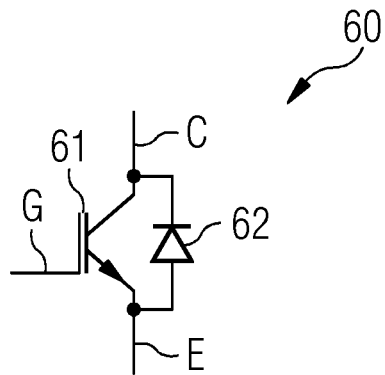
Figure 4:
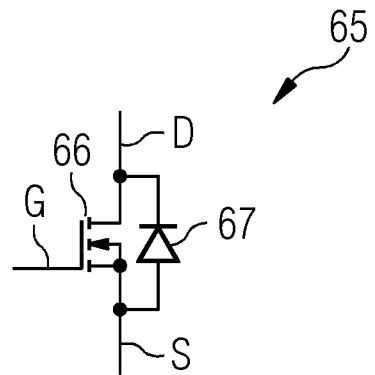
Figure 5:
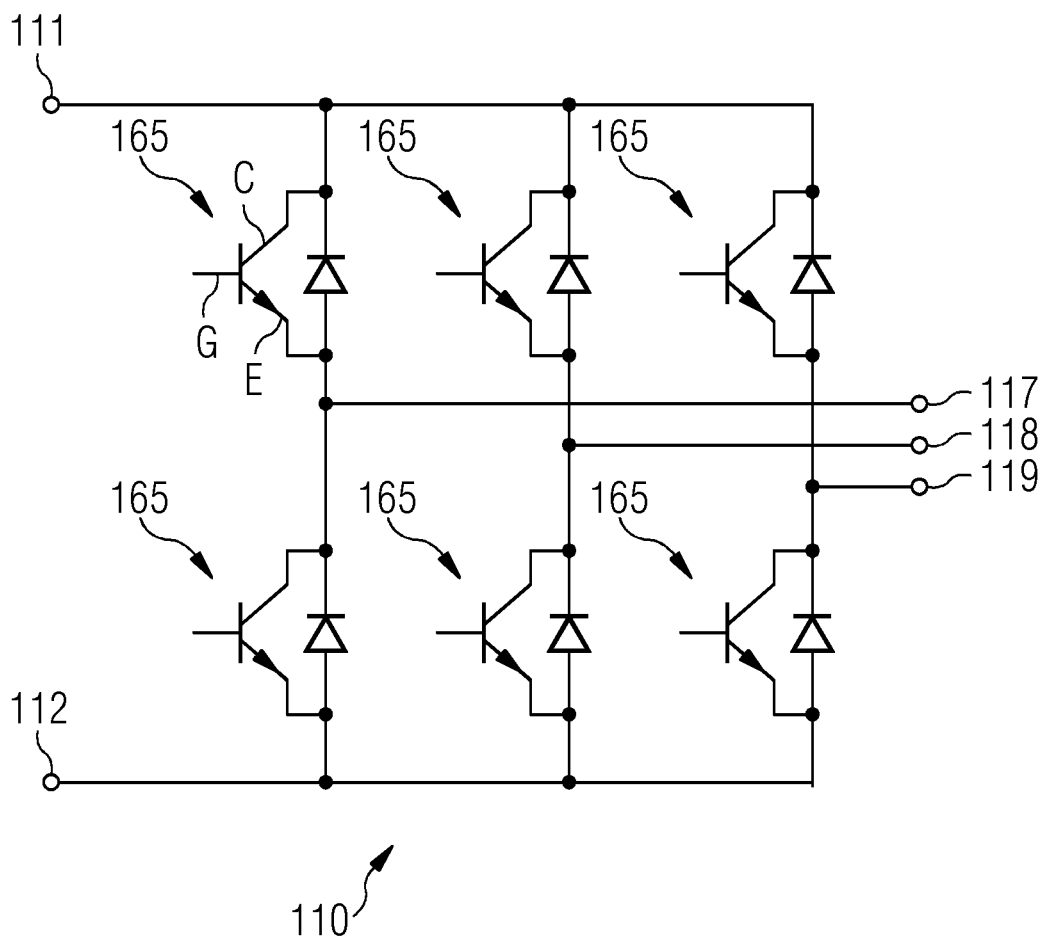
Figure 6:
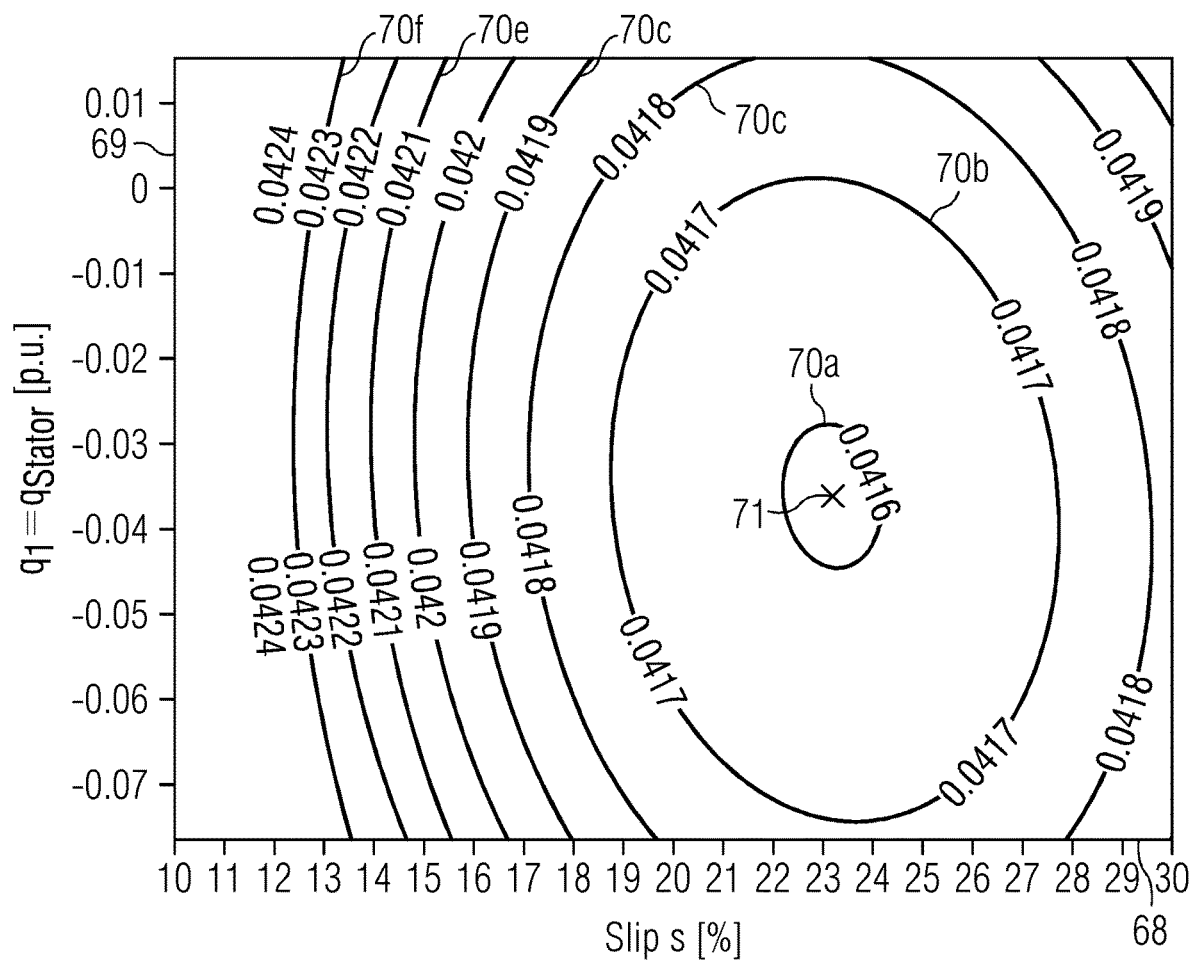
Figure 7:
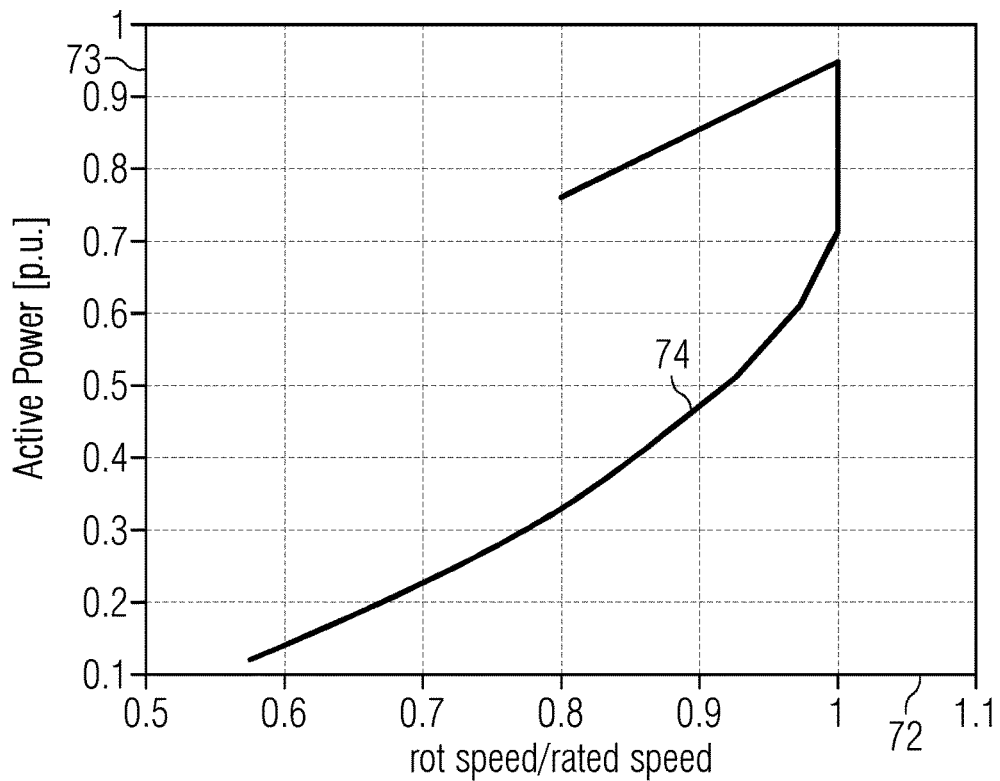
Figure 8:
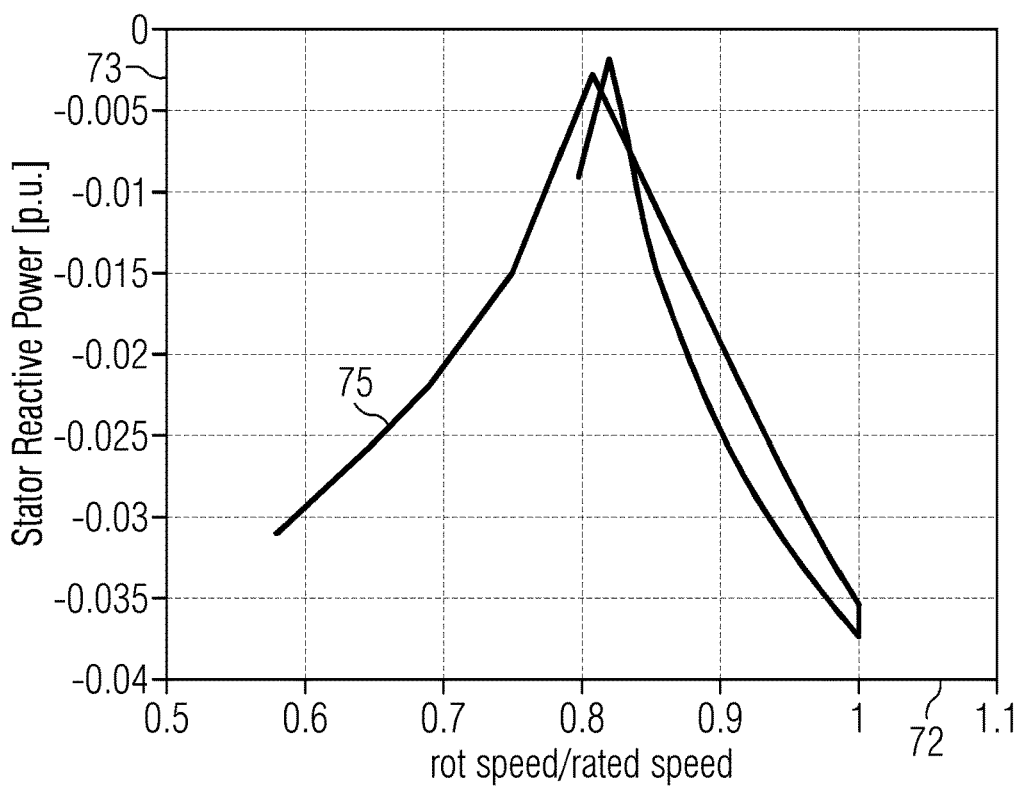

Some of the embodiments will be described in detail, with reference to the following figures, wherein like designations denote like members, wherein:

FIG. 1 schematically illustrates part of a wind turbine including an arrangement for controlling a utility grid connected grid side converter according to an example;

FIG. 2 schematically illustrates a portion of a method for controlling a grid side converter connected to a utility grid according to an example;

FIG. 3 schematically illustrates an IGBT module comprised in a grid side converter according to an example;

FIG. 4 schematically illustrates a SiC MOSFET comprised in a grid side converter according to an example;

FIG. 5 schematically illustrates a grid side converter according to an example;

FIG. 6 schematically illustrates a graph for determining electrical losses according to an example;

FIG. 7 schematically illustrates a graph regarding active power according to an example; and FIG. 8 illustrates a graph regarding stator reactive power according to an example.

DETAILED DESCRIPTION

The wind turbine 1 schematically illustrated in FIG. 1 may include a wind turbine rotor 2 at which plural rotor blades 3 may be connected. The wind turbine may further comprise a DFIG 4 which may be mechanically coupled to the wind turbine rotor 2. The wind turbine 1 may further comprise a rotor side converter 5 which may be connected to a rotor 6 of the DFIG 4. The wind turbine 1 may further comprise a DC link 7 which may be connected to output terminals 8, 9 of the rotor side converter 5. The wind turbine 1 may further comprise a grid side converter 10 which may be connected to the DC link 7, in particular to two DC link terminals 11 and 12.

The wind turbine 1 may further comprise an arrangement 50 for controlling the utility grid connected grid side converter 10 according to an example of the present invention, wherein the arrangement 50 may be connected via a control line 13 to control the grid side converter by control signals 14. The arrangement 50 may comprise an arithmetic and/or logic processor 51 which may be configured, in case a total DFIG reactive power demand 15 e.g. received from a grid operator or wind power plant reactive power controller 16) is greater than 0, to control the grid side converter 10, to supply reactive power Q2 to serve the total DFIG reactive power demand (Q_total) 15 according to a maximum possible degree so that a thermal limit of the grid side converter 10 is not exceeded. Thereby, the arrangement 50 may be configured for performing a method of controlling the utility grid connected grid side converter 10 according to an example of the present invention.

As can be seen from FIG. 1, the output terminals 17, 18, 19 of the grid side converter, i.e. three-phase output terminals, may be connected to the power grid 20. Thereby, the output terminals 17, 18, 19 of the grid side converter 10 may be also connected to output terminals 21, 22, 23 of the stator 25 of the DFIG 4. The stator 25 may comprise stator windings having the stator output terminals 21, 22, 23 configured to deliver or consume the reactive power Q1. In total, the sum Q1+Q2 of the reactive power Q1 delivered by the stator 25 of the DFIG 4 and the reactive power Q2 delivered or consumed by the grid side converter 10 may be delivered to or consumed by the power grid 20. Between the power grid 20 and the wind turbine 1, there may optionally be one or more transformers be connected in order to transform the output voltage to a higher value.

Output terminals of the grid side converter 17, 18, 19 may be connected to the output terminals of the stator 21, 22, 23 by a three-winding transformer whose low-voltage terminals may be connected to output terminals of stator 21, 22, 23 and output terminals of grid side converter 17, 18, 19 separately. Moreover, output terminals of the grid side converter 17, 18, 19 may be connected to the output terminals of the stator 21, 22, 23 by a transformer whose low-voltage side is connected to output terminals of grid side converter 17, 18, 19 and high-voltage side may be connected to output terminals of stator 21, 22, 23.

To generate the control signal 14 for the grid side converter, the arrangement 50 may receive grid side converter operation information 26 via a data line. This information 26 may relate to a thermal condition of the grid side converter 10, in particular its temperature at one or more locations. The information 26 may alternatively or additionally comprise information regarding the operating point, a cooling parameter, output voltage, output current, active power output and/or reactive power output of the grid side converter 10. The arrangement may then be configured to determine, in particular dynamically, the set point Q_GSC (as is for example presented by the control signal 14) of the grid side converter.

The grid side converter 10 may comprise a temperature sensor 27 which may be adapted to measure a temperature of electronic equipment within the grid side converter 10, in particular a controllable switch which will be described later on. The grid side converter 10 may further comprise an electric measurement sensor system 28 which may be configured to measure electrical output values, for example voltage, current, active power, reactive power of the grid side converter, etc. Measurement signals derived by the measurement sensors 27, 28 may be comprised within the grid side converter operation information 26 which may be supplied to the arrangement 50.

The grid side converter operation information 26 may then be used for assessing whether the thermal limit of the grid side converter 10 is reached or not. The arrangement 50 may for example comprise a data storage 29 holding respective limit values, such as a grid side converter reactive power limit value and/or a grid side converter temperature limit value.

The arrangement 50 may be configured to execute a loss minimization algorithm which may be based on a model of the DFIG system 40, i.e. including the DFIG 4, the rotor side converter 5, the DC link 7, the grid side converter 10 and optionally also connecting power cables. The physical model may also model losses occurring upon rotation of the rotor 2, for example bearing losses and other mechanical and/or electrical and/or electronic losses. The wind turbine rotor 2 may be for example supported rotatably using a bearing system and mechanical power train losses may be considered by the arrangement 50. Furthermore, different DFIG losses and/or converter losses and/or power cable losses may be considered, as listed and described above.

FIG. 2 schematically illustrates a portion 30 of a method for controlling a grid side converter, e.g. converter 10 illustrated in FIG. 1, connected to a utility grid according to an example. The portion 30 of the control method illustrates in some detail how the set point (Q_GSC) of the grid side converter reactive power may be determined.

In block 31, the total DFIG reactive power demand (Q_total) may be received. In block 32, it may be checked whether the total DFIG reactive power demand is greater than 0. If this is the case, in block 33, it may be checked whether the total DFIG reactive power demand is larger than the grid side converter reactive power limit value (Q_GSC_thr_lim). If this is the case, the control flow may be switched to the branch 34 leading to a setting block 35 in which the set point Q_GSC may be set to the grid side converter reactive power limit value Q_GSC_thr_lim. The stator reactive power (Q_stator) may be set such that the total DFIG reactive power (Q_total) is the sum of the stator reactive power (Q_stator) and the grid side converter reactive power (Q_GSC). In mathematical assignment this can be expressed as:

$$Q\_total = Q1 + Q2 = Q\_GSC + Q\_stator.$$

$$Q\_GSC = Q\_GSC\_thr\_lim.$$

$$Q\_stator = Q\_total - Q\_GSC.$$

If in block 33, it is determined that the total reactive power is not greater than the thermal limit value of the grid side converter reactive power the control flow may be branched in a branch 36 leading to a setting block 37. In block 37, the following settings may be performed:

(Q_stator=0 and Q_GSC=Q_total), or (Q_stator<0 and Q_GSC=Q_total−Q_stator_loss_min
as long as Q_GSC_loss_min<Q_GSC_thr_lim)

If the total reactive power demand Q_total equals 0 as may be assessed in block 38, in block 39, a loss minimization algorithm may be run in order to obtain a loss minimized set point Q_GSC_loss_min. Then, the following assessment or check may be performed:

$$|Q\_GSC\_loss\_min| > Q\_GSC\_thr\_lim;$$

If this assessment results to a positive output the control flow may be switched to a branch 40 leading to a setting block 41. In setting block 41, the following settings may be performed:

$$Q\_GSC = \mathrm{sgn}(Q\_GSC\_loss\_min) * Q\_GSC\_thr\_lim;$$

$$Q\_stator = -Q\_GSC;$$

Wherein "sgn( )" is the sign function, the sign function being 1 for positive argument and −1 for negative argument.

If the result of the assessment in block 39 is negative, control flow may be switched to a branch 42 leading to setting block 43. In block 43, the following setting may be performed:

$$Q\_stator\_loss\_min = -Q\_GSC;$$

Wherein the index "loss_min" means that the respective quantity may be calculated by a loss minimization process, as described above.

If, in block 44, the total reactive power demand is assessed to be smaller than 0, i.e. total reactive power demand is negative, a loss minimization algorithm may, in the block 45, may be performed. The loss minimization algorithm may be implemented similar to the algorithm in block 39. Then, the following assessment or check may be made:

$$|Q\_GSC\_loss\_min| > Q\_GSC\_thr\_lim$$

If this assessment results in a logically true result, the control flow may be switched to a branch 46 leading to a setting block 47. In the setting block 47, the following settings may be performed:

$$Q\_GSC = \mathrm{sgn}(Q\_GSC\_loss\_min) * Q\_GSC\_thr\_lim$$

$$Q\_stator = Q\_total - Q\_GSC$$

If the assessment, in block 45, leads to a logically false result, the control flow may be switched to a branch 48 leading to a setting block 49. In the setting block 49, the following settings may be performed:

$$Q\_GSC = Q\_GSC\_loss\_min;$$

$$Q\_stator = Q\_total - Q\_GSC;$$

The method steps 30 illustrated in FIG. 2 may for example be performed by the arrangement 50 illustrated in FIG. 1. At the end, the method portion 30 may output a set point Q_GSC of the grid side converter reactive power which may be represented for example by the control signal 14 output by the arrangement 50 illustrated in FIG. 1.

FIG. 3 schematically illustrates a controllable switch system 60 comprising an IGBT 61 and a diode 62 which may be connected in an antiparallel manner to the IGBT 61. According to an example, the diode 62 may be a SiC-diode, i.e. a diode comprising silicon and carbon. The IGBT 61 may be a conventional silicon based IGBT, thus an IGBT not comprising carbon. IGBT may comprise a gate G, a collector C and an emitter E. The gate G may be connected to a gate driver circuit which may receive for example the control signal 14 from the arrangement 50 illustrated in FIG. 1.

FIG. 4 schematically illustrates a SiC-MOSFET module 65 which may be comprised in the grid side converter 10 illustrated in FIG. 1. The SiC-MOSFET module 65 may comprise a SiC-MOSFET 66 and a SiC-diode 67. The SiC-MOSFET 66 may represent a MOSFET comprising silicon and carbon depicted using the conventional element symbol. In this example, both the IGBT or MOSFET as well as the diode may be electronic components comprising silicon and carbon. Those electronic elements may allow operation at a relatively high temperature while maintaining the losses in acceptable limits.

At least one, or in particular, all controllable switches of the grid side converter may be implemented using the SiC MOSFET 65 as illustrated in FIG. 4. The SiC-MOSFET module 65 may for example be used in the grid side converter 10 as illustrated in FIG. 1 or 5 for each power transistor.

The grid side converter 110 illustrated in FIG. 5 may comprise input terminals 111 and 112 at which a DC voltage from the DC link (for example element 7 in FIG. 1) may be applied. The grid side converter 110 may comprise (for a three-phase desired output power) two controllable switches 165 per each phase. The switches 165 may be configured as the SiC MOSFET module 65 illustrated in FIG. 4 or as the IGBT module 60 illustrated in FIG. 3. For each phase two controllable switches 165 may be connected in series Between respective series-connected controllable switches 165, one phase of the respective AC output power may be tapped. The AC power may be output at the output terminals 117, 118, 119 which may be indirectly connected to a utility grid. The grid side converter 110 can be also implemented with multilevel frequency converters.

Examples of the present invention enable the full utilization of the grid side converter for more reactive power flow. In order to prevent an increase in the converter losses, wide-band-gap semiconductors (for example SiC-based) may be used. A higher contribution to the reactive power from the grid side converter may lead to a decrease in the reactive power from the stator side, i.e. decrease of Q_stator. Thereby, the stator currents and rotor currents may decrease, thus reducing also the copper losses in the rotor and the stator and the RSC losses. Full utilization of the grid side converter for reactive power flow may be optimal for a demanded Q_total>0 (i.e. capacitive, generator over-exited). When the grid side converter performance is good enough, the grid side converter may deliver additional reactive power to the DFIG stator in order to magnetize the DFIG. The optimum values can be derived by running a loss minimization algorithm.

During operation, the wind turbine control device may receive or set an external demanded Q_total demand. Furthermore, the controller or in particular the arrangement 50 illustrated in FIG. 1 may periodically receive the thermal condition data of the grid side converter, the DFIG and other electrical components. The basic principle of the reactive power sharing may include to fully utilize the grid side converter up to the pre-defined thermal limits and supplying or consuming the remaining reactive power by the stator.

Thereby, the total reactive power output by the wind turbine is the algebraic sum of the reactive power output by the stator and the reactive power output by the grid side converter. While the value Q_total remains unchanged, the grid side converter reactive power may be increased until the thermal limits of the grid side converter may be reached, thereby, the stator reactive power may be decreased. It should be noted that the thermal limit of a SiC semiconductor controllable switch is higher than the respective limit of a conventional silicon based IGBT.

The example of the IGBT module 60 illustrated in FIG. 3 is the cheapest solution, since only the diode is silicon and carbide based. The transistor 61 however may be made without SiC, thereby reducing costs. Nevertheless, a decrease in the total losses of the DFIG electrical drive system may be obtained. The example illustrated in FIG. 4 may be cost-intensive regarding manufacturing. However, the loss reduction may lead to a further decrease in the total losses of the DFIG electrical drive system resulting in less costs in the long-term view during operation. Partial DFIG magnetization from the stator may lead to a reduction of DFIG and RSC (Rotor Side Converter) current and losses. This partial DFIG magnetization from the stator may be interpreted, for each operating point defined by (P,V,f,Q) as the optimization process of the wind turbine performance versus the partial grid side converter reactive power. This may lead to a minimum of losses and to a maximum of total efficiency of the wind turbine. The partial reactive power may be generated by the grid side converter without impact of the wind turbine reactive power requirement or demand. This example may be optimal for Q_total≤0, i.e. the generator may be e.g. underexcited.

FIG. 6 to 8 relate to cases in which Q_total≤0.

FIG. 6 illustrates in a coordinate system having abscissa 68 indicating slip and ordinate 69 indicating the stator reactive power ISO loss contours or curves 70a-70f for P=0.95 times the rated power. The optimum operating point may be found at a slip of 23.1% and a stator reactive power of −0.0363 pu (inductive, under-exited DFIG operation). The minimum losses are 0.0416 pu (ΔP/Srated). The reactive power set point of the grid side converter is Q_GSC_min_loss=0.0363 pu (times the rated value).

FIGS. 7 and 8 show the active power output 74 depending on the rotational speed 72, and the stator reactive power output 75 being dependent on the rotational speed 72.

Examples of the present invention allow an improvement of the annual energy production and LCoe improvement. Stator and rotor currents may decrease in examples of the present invention leading also to stator and rotor copper loss decrease. The rotor side and grid side converter active power losses may be decreased. Reduction of the temperature of components and therefore reduction of the cooling requirements of the wind turbine may be enabled. Furthermore, requirements of the cooling system may be reduced. Using SiC-based semiconductors instead of Si-based semiconductors may give opportunities for different modes of operation. Increasing the portion of the reactive power supplied or consumed by the grid side converter may be performed in embodiments of the present invention. Because the portion of the reactive power is increased for the grid side converter, the one for the rotor side converter may decrease. This may lead to some changes in the rotor and stator losses. Rotor side converter losses, rotor and stator copper losses may decrease and thus the total system losses may decrease. The converter topology may not be changed compared to the conventional converter topology, only semiconductors may be replaced and replaced by silicon carbide-based semiconductors.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a reactive power exchange of a Doubly-Fed Induction Generator (DFIG) wind facility with a grid, the DFIG wind facility comprising a utility grid connected grid side converter connected via a DC link and a rotor side converter to a rotor of a DFIG, the method comprising:

determining a grid side converter reactive power thermal limit value;

determining a value of a required DFIG magnetizing reactive power to be consumed by a stator;

setting dynamically a sharing of a reactive power between the stator and the grid side converter such that the grid side converter reactive power value is a difference between a reactive power demand of the DFIG wind facility and the magnetizing reactive power consumed by the stator;
operating the DFIG wind turbine facility such that an absolute value of grid side converter reactive power is adjusted to be below the grid side converter reactive power thermal limit value value;
in case a total DFIG reactive power demand is greater than zero:
controlling the grid side converter to supply reactive power to serve the total DFIG reactive power demand total-according to a maximum possible degree so that the grid side converter operates within a thermal limit, so that a thermal limit of the grid side converter is not exceeded.

2. The method according to claim 1, wherein the grid side converter is controlled by a setpoint of grid side converter reactive power,
the method further comprising:
receiving grid side converter operation information regarding at least one of:
a thermal condition of the grid side converter; a grid side converter cooling parameter;
a grid side converter operating point;
output voltage of the grid side converter;
output current of the grid side converter;
active power output of the grid side converter; or
reactive power output of the grid side converter; and
determining, dynamically the setpoint of the grid side converter reactive power further based on the grid side converter operation information and at least one operation parameter limit value.

3. The method according to claim 1, wherein a setpoint of the grid side converter reactive power is determined to not exceed a predetermined grid side converter reactive power limit value and/or
wherein the setpoint of the grid side converter reactive power is determined and/or dynamically adapted such that a predetermined grid side converter temperature limit value is not exceeded by monitoring a grid side converter temperature.

4. The method according to claim 1, the method comprising, in case a total DFIG reactive power demand is not greater than zero:
determining a loss minimized setpoint of the grid side converter reactive power by a loss minimization algorithm,
wherein:
in case an absolute value of the loss minimized setpoint is greater than the grid side converter reactive power limit value, the setpoint of the grid side converter reactive power is set to a sign of the loss minimized setpoint multiplied with the grid side converter reactive power limit value, and
in case the absolute value of the loss minimized setpoint is not greater than the grid side converter reactive power limit value, the setpoint of the grid side converter reactive power is set to the grid side converter reactive power limit value.

5. The method according to claim 4, wherein:
the loss minimization algorithm is based on a physical model of the DFIG and/or the rotor side converter and/or the grid side converter and/or connecting cables and/or auxiliary equipment, and
the loss minimization algorithm is configured to obtain the loss minimized setpoint of the grid side converter reactive power by solving at least one non-linear equation in an iterative manner.

6. The method according to claim 5, wherein the loss minimization algorithm is adapted to consider of at least one of:
at least one mechanical power train loss, in dependence of rotational speed and/or active power output;
at least one DFIG loss, in dependence of active power and/or voltage and/or rotational speed and/or at least one temperature and/or the total DFIG reactive power demand and/or the setpoint of the grid side converter reactive power and/or the reactive power output by the stator of the DFIG and/or AC output frequency;
at least one converter loss, in dependence of active power and/or voltage and/or rotational speed and/or at least one temperature and/or the total DFIG reactive power demand and/or the setpoint of the grid side converter reactive power and/or the reactive power output by the stator of the DFIG and/or AC output frequency; or
at least one power cable loss and/or auxiliary system consumption and/or cooling system consumption, comprising stator cable loss and/or DFIG cooling fan consumption.

7. The method according to claim 6, wherein the DFIG loss includes at least one of:
at least one stator loss, including winding joule loss and/or core loss and/or additional loss;
at least one rotor loss, including winding joule loss and/or core loss and/or additional loss;
windage loss;
friction loss;
brush voltage drop;
and/or
wherein the converter loss includes at least one of:
switching commutation loss;
inductance core loss;
filter capacitor loss;
auxiliary system and supplies;
switching loss;
Rotor Side Converter and Grid Side Converter Power cable loss;
Protection and/or manoeuvre device loss.

8. The method according to claim 1, further comprising:
setting the setpoint of the reactive power output by the stator of the DFIG to the total DFIG reactive power demand diminished by the setpoint, of the grid side converter reactive power.

9. The method according to any aim 1,
wherein the grid side converter is configured as a multiphase DC-AC-converter and comprises a plurality of power transistors, wherein at least one power transistor comprises a diode connected in parallel.

10. The method according to claim 9, wherein at least one of the diodes and/or at least one the power transistors is Si—C based, and/or at least one of the transistor comprises a SiC-MOSFET.

11. The method according to claim 1, where a stator of the DFIG is coupled to a utility grid.

12. The method according to any claim 1, wherein the DFIG is a wind turbine generator mechanically coupled to a rotor at which a plurality of rotor blades are connected.

13. An arrangement for controlling a utility grid connected grid side converter connected via a DC link and a rotor side converter to a rotor of a DFIG, the arrangement comprising:
- an arithmetic and/or logic processor configured to:
- control, in case a total DFIG reactive power demand is greater than zero the grid side converter to supply reactive power to serve the total DFIG reactive power demand according to a maximum possible degree so that a thermal limit of the grid side converter is not exceeded; and
- implement the method according to claim 1.

14. A wind turbine, comprising:
- a wind turbine rotor at which a plurality of rotor blades are connected;
- a DFIG mechanically coupled to the wind turbine rotor;
- a rotor side converter connected to a rotor of the DFIG;
- a DC link connected to the rotor side converter;
- a grid side converter connected to the DC-link; and
- the arrangement according to claim 13, connected to control the grid side converter, and wherein the rotor side converter and/or the grid side converter further comprise Si—C based or wide band gap elements.

* * * * *